United States Patent
Park

(10) Patent No.: US 7,405,813 B2
(45) Date of Patent: Jul. 29, 2008

(54) SYSTEM AND METHOD FOR MEASURING TIP VELOCITY OF SPRAYED FUEL

(75) Inventor: Young-Kug Park, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 62 days.

(21) Appl. No.: 11/243,028

(22) Filed: Oct. 4, 2005

(65) Prior Publication Data

US 2006/0072101 A1    Apr. 6, 2006

(30) Foreign Application Priority Data

Oct. 5, 2004    (KR) .................. 10-2004-0079071

(51) Int. Cl.
*G01P 3/38* (2006.01)
*F02B 5/00* (2006.01)
(52) U.S. Cl. ........................ 356/28; 123/305
(58) Field of Classification Search .......... 356/28, 356/28.5; 382/107; 123/305
See application file for complete search history.

(56) References Cited

U.S. PATENT DOCUMENTS

| | | | | |
|---|---|---|---|---|
| 5,249,954 A | * | 10/1993 | Allen et al. | 431/14 |
| 5,748,775 A | * | 5/1998 | Tsuchikawa et al. | 382/190 |
| 6,659,075 B1 | * | 12/2003 | Tokuyasu et al. | 123/301 |
| 6,672,277 B2 | * | 1/2004 | Yasuoka et al. | 123/295 |
| 6,874,480 B1 | * | 4/2005 | Ismailov | 123/494 |
| 6,931,146 B2 | * | 8/2005 | Aoki et al. | 382/107 |
| 7,143,641 B2 | * | 12/2006 | Palazzolo et al. | 73/119 A |
| 2001/0055063 A1 | * | 12/2001 | Nagai et al. | 348/116 |
| 2002/0195079 A1 | * | 12/2002 | Kubo | 123/295 |

FOREIGN PATENT DOCUMENTS

| | | | | |
|---|---|---|---|---|
| JP | 08201413 A | * | 8/1996 | |
| JP | 11211743 A | * | 8/1999 | |

* cited by examiner

*Primary Examiner*—Isam Alsomiri
(74) *Attorney, Agent, or Firm*—Morgan Lewis & Bockius LLP

(57) ABSTRACT

A system and method for measuring tip velocity of sprayed fuel in an engine includes a light source, a lens, a Charge-Coupled Device (CCD) camera, and a control unit. The lens allows light, which is emitted from the light source, to enter into a combustion chamber. The CCD camera photographs the shapes of the dispersion of the sprayed fuel. The control unit causes the light source to emit light two times by controlling the light source, acquiring a single frame image of the shapes of the dispersion of the sprayed fuel by controlling the CCD camera, and calculates the tip velocity of the sprayed fuel by processing the acquired image.

7 Claims, 6 Drawing Sheets

FIG.4
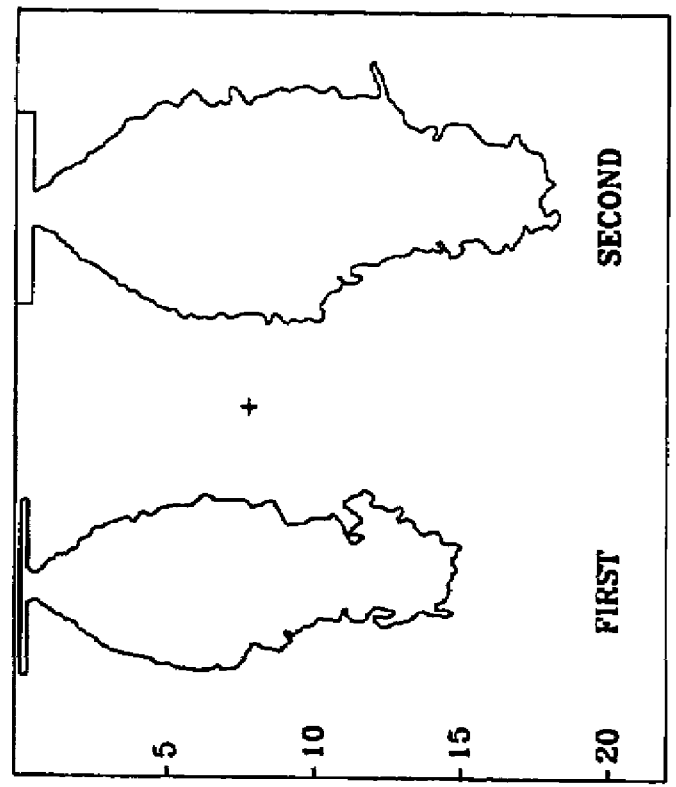
(b) TWO DIVIDED IMAGES
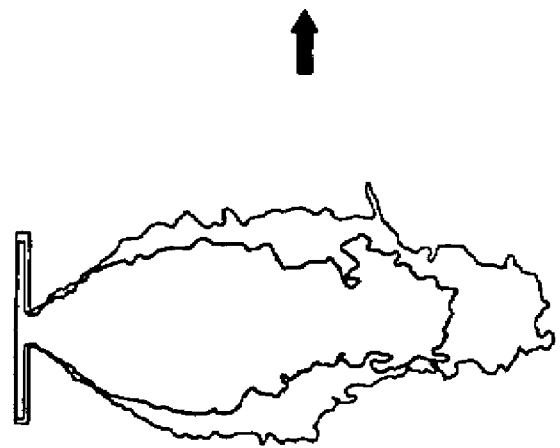
(a) ORIGINAL IMAGE

SYSTEM AND METHOD FOR MEASURING TIP VELOCITY OF SPRAYED FUEL

CROSS-REFERENCE TO RELATED APPLICATIONS

The present application is based on, and claims priority from, Korean Application Serial Number 10-2004-0079071, filed on Oct. 5, 2004, the disclosure of which is hereby incorporated by reference herein in its entirety.

FIELD OF THE INVENTION

The present invention relates to a system and method for measuring the tip velocity of sprayed fuel in an engine and, more particularly, to a system and method for measuring the velocity of liquid fuel sprayed from an injector into a combustion chamber in a vehicle engine.

BACKGROUND OF THE INVENTION

Generally, the injector of a vehicle engine supplies liquid fuel to the interior of a combination chamber. This process is accompanied by an atomization process to improve ignition performance and the combustion efficiency of fuel.

The above-described atomization process of liquid fuel occurs as the pressure energy of fuel is converted into velocity energy while the liquid fuel is passed through the orifice of an injector. The velocity of the liquid fuel, which is passed through the orifice of the injector at the early stage of fuel injection, and the tip velocity of sprayed fuel, which is generated at the early stage of fuel injection, play important roles in the atomization of liquid fuel.

Particularly, in a diesel engine into which fuel is sprayed in high-pressure surroundings, the tip velocity of sprayed fuel greatly affects the wall impinging and wall wetting of fuel particles, and the degree of penetration of sprayed particles in a cylinder.

For these reasons, various methods are employed to measure the velocity of sprayed particles. Of the methods, the representative methods include a Phase Doppler Analysis (PDA) method that uses the scattering of light caused by particles, and Particle Image Velocimetry (PIV) and Particle Trajectory Velocimetry (PTV) methods that graphically process the tracks of sprayed particles.

However, in the above-described methods, it is impossible to measure the velocity of sprayed fuel as liquid fuel exists in a liquid column or liquid ligament form at the early stage of fuel injection. Furthermore, the PDA method enables real-time measurement, but uses a laser as a light source, so that equipment prices are very high.

SUMMARY OF THE INVENTION

Embodiments of the present invention provide a system and method for measuring the tip velocity of sprayed fuel in an engine, which photographs the shapes of the dispersion of sprayed fuel while a light source emits light two times toward the fuel sprayed into a combustion chamber from an injector, and measures the tip velocity of sprayed fuel based on a distance to which the boundary of the shape of the dispersion of the sprayed fuel moves, so that the tip velocity of the sprayed fuel can be measured even when fuel is sprayed into the combustion chamber in a liquid column or liquid ligament form.

In an exemplary system for measuring the tip velocity of sprayed fuel in an engine according to one embodiment of the present invention, the system includes a light source; a lens for allowing light, which is emitted from the light source, to enter into a combustion chamber; a Charge-Coupled Device (CCD) camera for photographing shapes of dispersion of the sprayed fuel; and a control unit for causing the light source to emit light two times by controlling the light source, acquiring the single frame image of the shapes of the dispersion of the sprayed fuel by controlling the CCD camera, and calculating the tip velocity of the sprayed fuel by processing the acquired image.

The system further may include a pinhole for eliminating a region, in which light is scattered, in front of the CCD camera. The lens is a convex lens located between the light source and the combustion chamber.

In addition, the present invention provides methods for measuring the tip velocity of sprayed fuel in an engine. An exemplary embodiment of a method according to the present invention may include steps of causing a light source to emit light toward a combustion chamber into which fuel is sprayed; photographing shapes of the dispersion of the sprayed fuel during two emissions of the light source, and acquiring the single frame image of the shapes of the dispersion of the sprayed fuel from two emissions of the light source; dividing the single frame image into two images based on brightness values, obtaining boundaries between the shapes of the dispersion of the sprayed fuel and a background from the divided images, and obtaining a movement distance from the obtained boundaries; and calculating the tip velocity of the sprayed fuel by dividing the movement distance by a time interval in which the light source emits light two times.

The step of dividing the single frame image into two images based on the brightness values may include the steps of acquiring a first image by setting a brightness value of each pixel to 0 when the brightness value of the pixel is smaller than a first threshold value, and by setting the brightness value of each pixel to 1 when the brightness value of the pixel is equal to or larger than the first threshold; and acquiring a second image by setting a brightness value of each pixel to 0 when the brightness value of the pixel is smaller than a second threshold value, and by setting the brightness value of each pixel to 1 when the brightness value of the pixel is equal to or larger than the second threshold.

The second threshold value is preferably larger than the first threshold value, and is smaller than the brightness value of the background.

The step of obtaining the boundaries between the shapes of the dispersion of the sprayed fuel and the background from the divided images determines that a corresponding pixel is located in a boundary region if a value, which is obtained by multiplying the brightness value of an arbitrary pixel by (4-brightness values of 4 pixels adjacent to the arbitrary pixel), is 1.

BRIEF DESCRIPTION OF THE DRAWINGS

For a better understanding of the nature and objects of the present invention, reference should be made to the following detailed description with the accompanying drawings, in which:

FIG. 4 a diagram illustrating a process of dividing an image, which is photographed by the CCD camera, into two images in the present invention;

DETAILED DESCRIPTION OF THE PREFERRED EMBODIMENTS

A preferred embodiment of the present invention is described with reference to accompanying drawings below.

Figure 1:
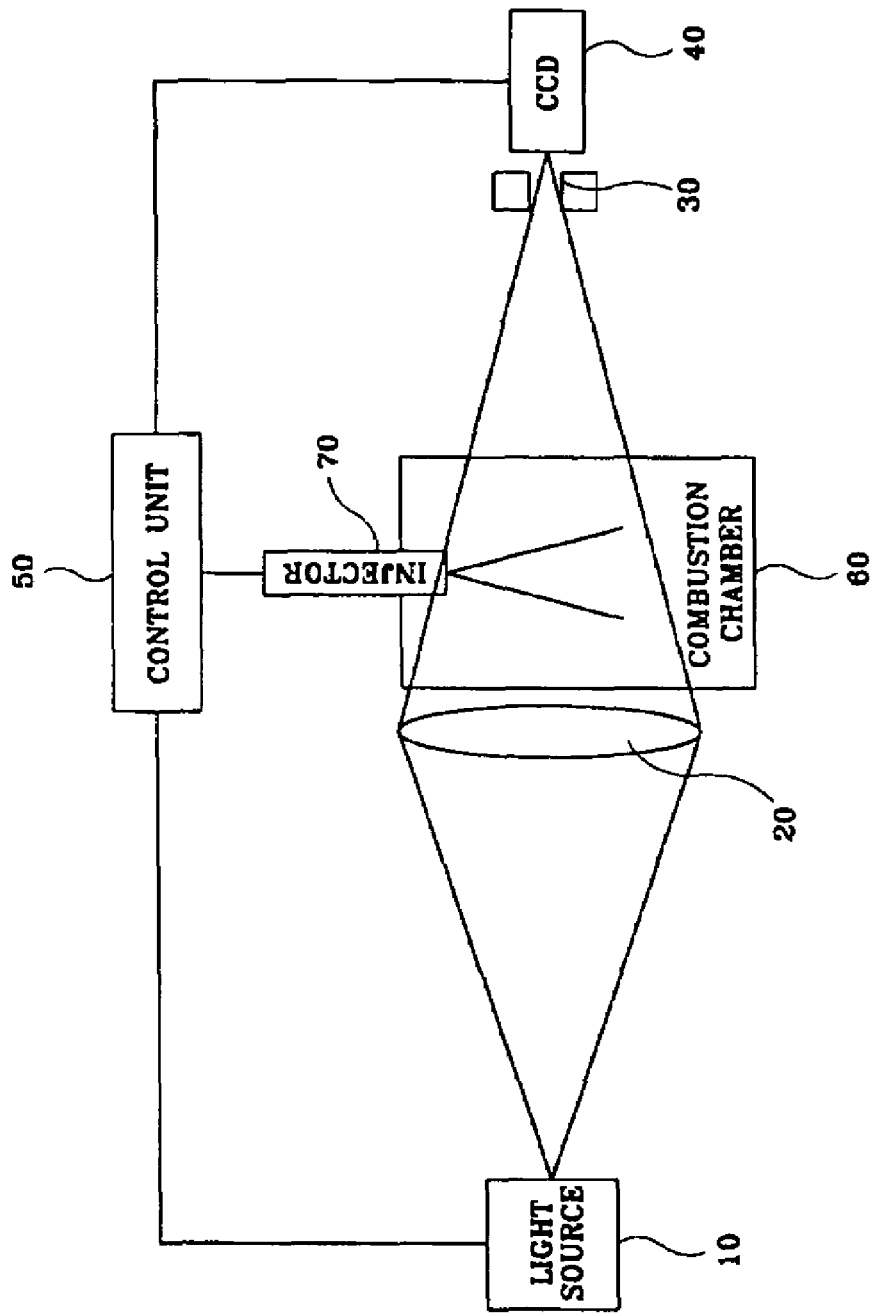
FIG. 1 is a diagram illustrating one embodiment of a system for measuring the tip velocity of sprayed fuel in an engine according to the present invention.

As shown in FIG. 1, the system for measuring the tip velocity of sprayed fuel in an engine according to the present invention includes a light source 10, a lens 20, a pinhole 30, a CCD camera 40, and a control unit 50.

The light source 10 emits light under the control of the control unit 50, and the lens 20 is a convex lens that is located between the light source 10 and a combustion chamber 60 to condense the light emitted from the light source 10 and allow the condensed light to enter into the combustion chamber 60. That is, the distortion of an image occurs when the lens 20 is installed between the combustion chamber 60 and the CCD camera 40, so that the lens 20 is installed between the light source 10 and the combustion chamber 60 to prevent the distortion.

The pinhole 30 is located between the combustion chamber 60 and the CCD camera 40 to eliminate a region in which light passing through the combustion chamber 60 scatters and allow the light to enter into the CCD camera 40.

The CCD camera 40 photographs the shapes of the dispersion of the fuel sprayed into the combustion chamber 60 and allows the photographed result to be input to the control unit 50.

The control unit 50 controls the light source, the CCD camera, and an injector 70, and produces the tip velocity of the sprayed fuel. Control unit 50 may comprise a processor, memory and associated hardware, software and/or firmware as may be selected and programmed by a person of ordinary skill based on the teachings contained herein.

The control unit 50 causes fuel to be sprayed into the combustion chamber 60 by outputting an injector drive signal and driving the injector 70, and photographs the shapes of the dispersion of the sprayed fuel by causing the light source to emit light two times and operating the CCD camera 40. Furthermore, the control unit 50, as described above, divides a single frame image of the shapes of the dispersion of the sprayed fuel, which is acquired from two emissions of the light source 10, into two images based on brightness values, obtaining boundaries between the shapes of the dispersion of the sprayed fuel and a background from the divided images, and calculates the tip velocity of the sprayed fuel by dividing a movement distance between the obtained boundaries by a time interval in which the light source emits light two times.

The operation and effect of a system and method for measuring the tip velocity of sprayed fuel in an engine according to the present invention are described in detail below.

Figure 2:
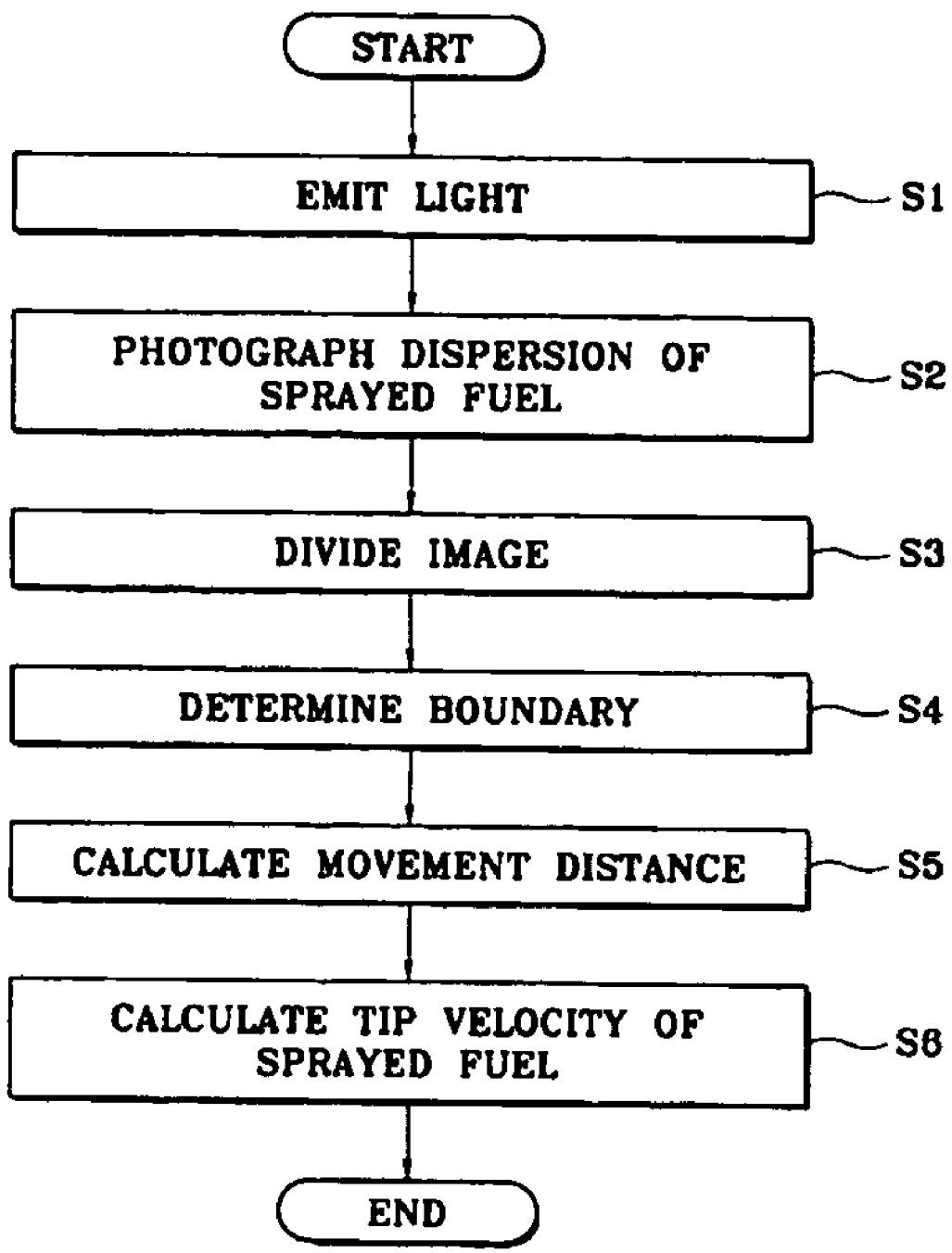
FIG. 2 is a flowchart illustrating a method for measuring the tip velocity of sprayed fuel in an engine according to an embodiment of the present invention.

As shown in FIG. 2, the control unit 50 causes the light source 10 to emit light toward the combustion chamber 60 into which fuel is sprayed from the injector 70, at step S1. Thereafter, the CCD camera 40 photographs the shapes of the dispersion of the sprayed fuel during two emissions of the light source 10, and acquires a single frame image of the shapes of the dispersion of the sprayed fuel during two emissions of the light source 10, at step S2.

Figure 3:
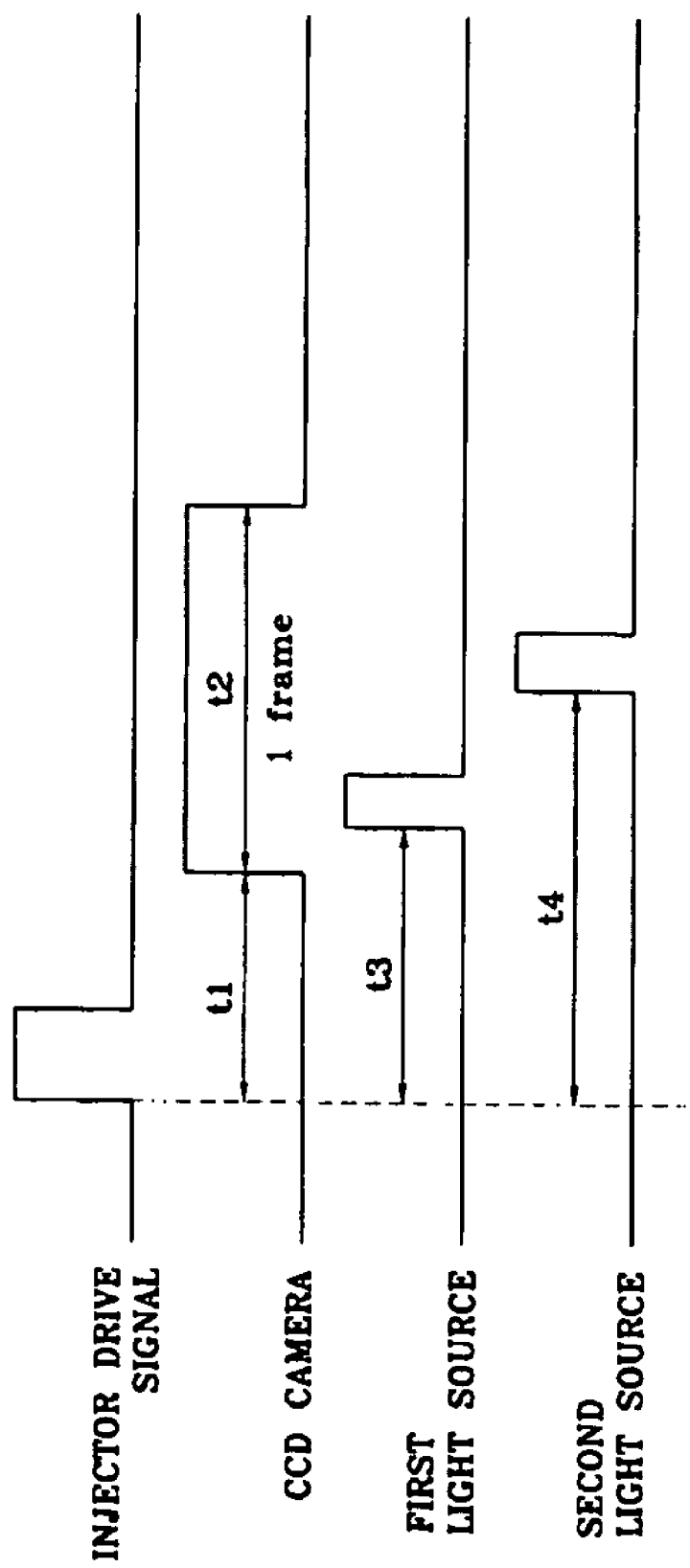
FIG. 3 is a timing diagram illustrating the operational status of a light source and a CCD camera in the present invention.

That is, the control unit 50, as shown in the timing diagram of FIG. 3, causes fuel to be sprayed into the combustion chamber 60 by outputting an injector drive signal and driving the injector 70, and allows the shapes of the dispersion of the sprayed fuel to be photographed during a predetermined time period t2 by operating the CCD camera 40 after making a delay of a predetermined time t1.

In this case, the control unit 50 makes a delay of a predetermined time t3 after outputting the injector drive signal and then causes the light source 10 to emit light a first time, and also makes a delay of a predetermined time period t4 and then causes the light source 10 to emit light a second time. Both the first and second emissions must be performed within a single frame period of the CCD camera 40.

Thereafter, at step S3, the control unit 50 divides a single frame image, which is acquired in the above-described manner, into two images based on brightness values. That is, the inner portion in the original image of FIG. 4 (a) is a darker image acquired by the first emission of the light source 10, and the outer portion is a relatively lighter image acquired by the second emission of the light source 10. The distribution of the total brightness value of the acquired image is represented in FIG. 5.

Figure 5:
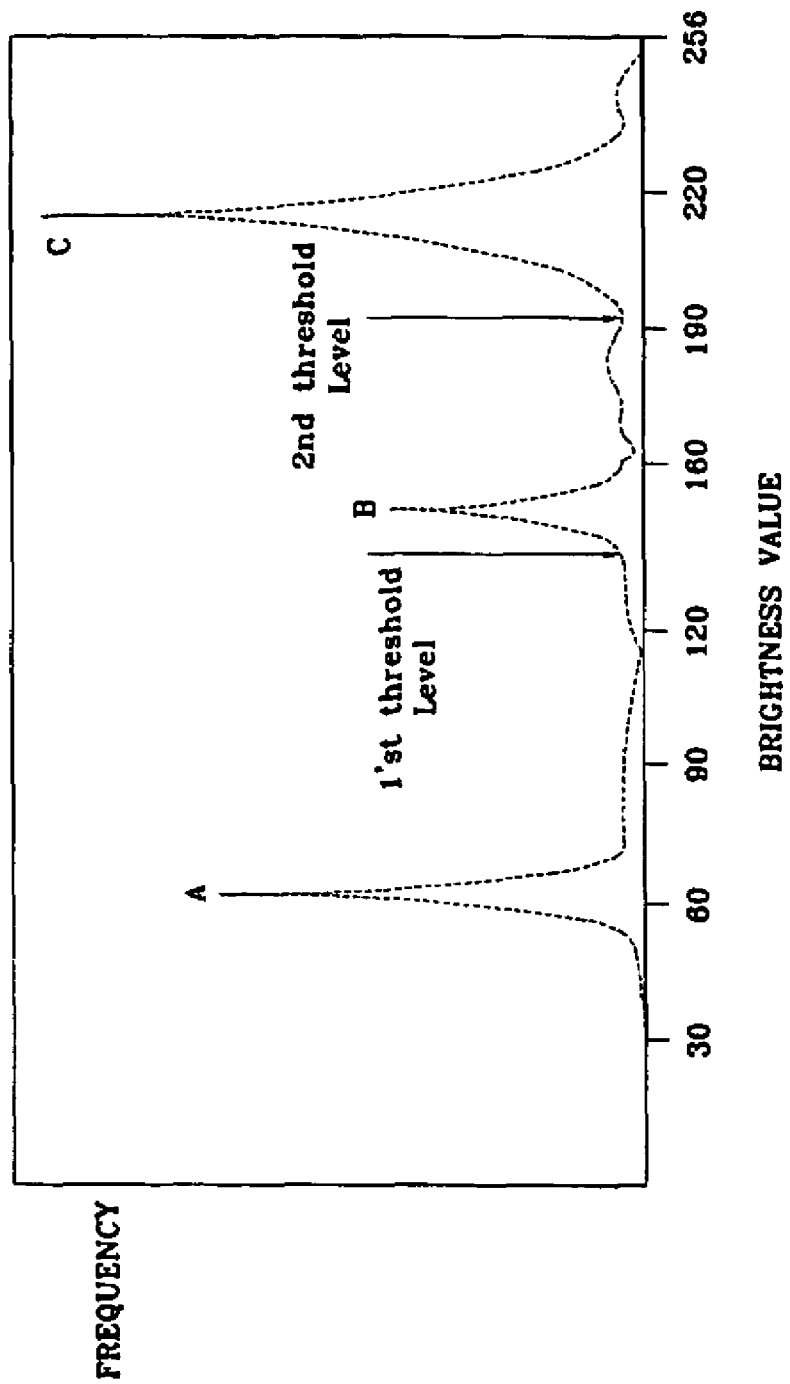
FIG. 5 is a diagram showing the distribution of a total brightness value of the image photographed by the CCD camera in the present invention.
Figure 6:
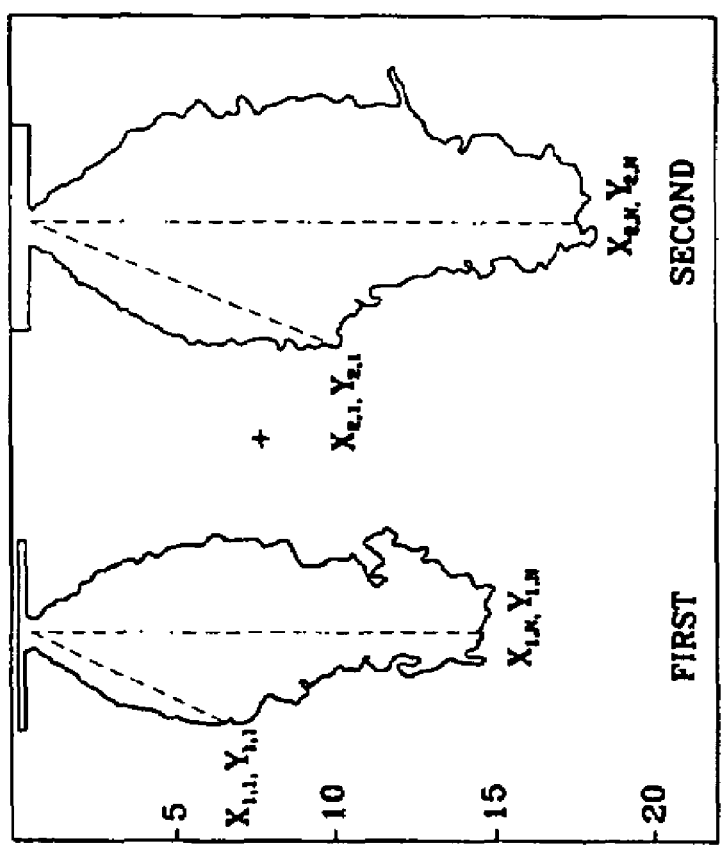
FIG. 6 is a diagram illustrating the movement distance of the dispersion of sprayed fuel in the present invention.

In FIG. 5, an A portion and a B portion indicate the brightness values of the shapes of the dispersion of the sprayed fuel, which are acquired with the first and second emissions of the light source, and a C portion indicates the brightness value of the background.

Based on the distribution of the brightness values, the first image is obtained using the following Equation 1, and the second image is obtained using the following Equation 2.

$$\text{Pixel }(x,y)=0 \text{ if Pixel }(x,y)<\text{a first threshold value Pixel} \\ (x,y)=1 \text{ if Pixel }(x,y)\geq \text{a first threshold value} \quad (1)$$

$$\text{Pixel }(x,y)=0 \text{ if Pixel }(x,y)<\text{a second threshold value} \\ \text{Pixel }(x,y)=1 \text{ if Pixel }(x,y)\geq \text{a second threshold} \\ \text{value} \quad (2)$$

When the above-described method is applied, the original image can be divided into two images shown in FIG. 4(b). In this case, the second threshold value is greater than the first threshold value and is smaller than the brightness value of the background.

Thereafter, the control unit 50 obtains the boundary of the dispersion of the sprayed fuel for each image divided at the step S3, at step S4. That is, as indicated in the following Equation 3, the step S4 determines that a corresponding pixel is located in a boundary region if a value, which is obtained by a brightness value of an arbitrary pixel multiplied by (4-summation of brightness values of four pixels adjacent to the arbitrary pixel), is equal to 1.

$$\text{Boundary}(x,y)=\text{Pixel}(x,y)\times(4-\text{Pixel}(x-1, y)-\text{Pixel}(x+ \\ 1, y) -\text{pixel}(x,y-1)-\text{Pixel}(x,y+1)) \text{ Boundary}(x,y) \\ =0 \text{ (if Pixel}(x,y) \text{ is inside or outside sprayed} \\ \text{region Boundary}(x,y)=1 \text{ (if Pixel}(x,y) \text{ is in} \\ \text{boundary region)} \quad (3)$$

Thereafter, a movement distance between boundaries that are obtained upon the above-described images is obtained at step S5. That is, the movement direction of each boundary is detected by applying a dispersion recognition algorithm for the boundaries of the first and second images, and the movement distance $L_i$ is obtained using the following Equation 4.

$$L_i=\sqrt{(x_{2,i}-x_{1,i})^2+(y_{2,i}-y_{1,i})^2} \quad (4)$$

In the above-described equation 4, the subscripts 1 and 2 indicate the boundaries of the first and second images, and i stands for the calculation order of boundaries. When the image magnification ratio of the measuring system according to the present invention is applied to the movement distance obtained by the above-described equation 4, an actual movement distance is acquired.

Thereafter, at step S6, a time interval, in which the light source emits light two times, that is t4-t3 in FIG. 3, is obtained, and the actual movement distance obtained at step S5 is divided by the obtained time interval, so that the tip velocity of the sprayed fuel is calculated.

As apparent from the foregoing, in accordance with the present invention, the shapes of the dispersion of sprayed fuel are photographed while a light source emits light two times toward the fuel sprayed into a combustion chamber from an injector, and the tip velocity of the sprayed fuel is measured based on a distance to which the boundary of the shape of the dispersion of the sprayed fuel moves, so that the tip velocity of the sprayed fuel can be measured even when fuel is sprayed into the combustion chamber in a liquid column or liquid ligament form.

What is claimed is:

1. A system for measuring tip velocity of sprayed fuel in an engine, comprising:
   a light source;
   a lens for allowing light emitted from the light source to enter into a combustion chamber;
   a Charge-Coupled Device (CCD) camera configured to provide images of dispersion shapes of the sprayed fuel; and
   a control unit controlling the light source to emit light at least two times during an exposure period of the CCD camera, acquiring a single frame image comprising the dispersion shapes of the sprayed fuel captured by the CCD camera at each light emission, and calculating the tip velocity of the sprayed fuel by processing the acquired single frame image.

2. The system as set forth in claim 1, further comprising a pinhole for eliminating a region, in which light is scattered, in front of the CCD camera.

3. The system as set forth in claim 1, wherein the lens is a convex lens located between the light source and the combustion chamber.

4. A method for measuring tip velocity of sprayed fuel in an engine, comprising:

emitting light twice toward a combustion chamber into which fuel is sprayed, with a time interval between the two light emissions;
photographing dispersion shapes of the sprayed fuel during the two emissions of light, and acquiring a single frame image of the dispersion shapes of the sprayed fuel from the two emissions of light;
dividing the single frame image into first and second dispersion images based on brightness values, from the single frame image;
obtaining a first boundary between the first dispersion image and a background, and a second boundary between the second dispersion image and the background;
obtaining a movement distance from the obtained boundaries; and
calculating the tip velocity of the sprayed fuel by dividing the movement distance by the time interval between the two light emissions.

5. The method as set forth in claim 4, wherein
acquiring the first dispersion image comprises setting a brightness value of each pixel to 0 when the brightness value of the pixel is smaller than a first threshold value, and by setting a brightness value of each pixel to 1 when the brightness value of the pixel is equal to or larger than the first threshold; and
acquiring the second dispersion image comprises setting a brightness value of each pixel to 0 when the brightness value of the pixel is smaller than a second threshold value, and by setting a brightness value of each pixel to 1 when the brightness value of the pixel is equal to or larger than the second threshold.

6. The method asset forth in claim 5, wherein the second threshold value is larger than the first threshold value, and is smaller than a brightness value of the background.

7. The method as set forth in claim 5, wherein the step of obtaining the boundaries of each dispersion image comprises:
   selecting an arbitrary pixel in the dispersion image;
   selecting four pixels adjacent to the arbitrary pixel;
   obtaining a summation of the brightness values of the selected four pixels; and
   determining that the arbitrary pixel is located in a boundary region if a brightness value, which is obtained by a brightness value of the arbitrary pixel multiplied by the value of 4 less than the summation of the brightness values of the selected four pixels, is equal to 1.

* * * * *